United States Patent
Willey et al.

(10) Patent No.: US 8,192,572 B2
(45) Date of Patent: Jun. 5, 2012

(54) COMPOSITE WIND TURBINE TOWER AND A METHOD FOR FABRICATING SAME

(75) Inventors: Lawrence Donald Willey, Simpsonville, SC (US); Shu Ching Quek, Clifton Park, NY (US); Danian Zheng, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1040 days.

(21) Appl. No.: 12/109,463

(22) Filed: Apr. 25, 2008

(65) Prior Publication Data
US 2009/0266004 A1    Oct. 29, 2009

(51) Int. Cl.
*B65H 81/00* (2006.01)

(52) U.S. Cl. ........ 156/148; 156/149; 156/169; 156/172; 156/173; 156/175

(58) Field of Classification Search ................ 156/148, 156/149, 169, 173, 175, 172
See application file for complete search history.

(56) References Cited

U.S. PATENT DOCUMENTS

| | | | | |
|---|---|---|---|---|
| 4,385,952 A | * | 5/1983 | Futakuchi et al. | ............ 156/174 |
| 4,514,447 A | * | 4/1985 | Boxmeyer | .................. 428/36.3 |
| 4,923,541 A | | 5/1990 | Burger | |
| 5,513,477 A | | 5/1996 | Farber | |
| 5,817,203 A | | 10/1998 | Moser | |
| 5,900,194 A | | 5/1999 | Ashton | |
| 6,099,906 A | * | 8/2000 | Palmer et al. | .................. 427/296 |
| 6,367,225 B1 | | 4/2002 | Ashton | |
| 6,408,575 B1 | | 6/2002 | Yoshida et al. | |
| 6,467,233 B1 | | 10/2002 | Maliszewski et al. | |
| 6,470,645 B1 | | 10/2002 | Maliszewski et al. | |
| 6,532,700 B1 | | 3/2003 | Maliszewski et al. | |
| 7,011,497 B2 | | 3/2006 | Schmidt | |
| 7,247,213 B2 | | 7/2007 | Reynolds, Jr. et al. | |

FOREIGN PATENT DOCUMENTS

| | | |
|---|---|---|
| WO | 2005028781 A2 | 3/2005 |
| WO | 2005067544 A2 | 7/2005 |

OTHER PUBLICATIONS

Gutierrez, et al "A wind turbine tower design based on the use of fibre reinforced composites"European Commission Joint Research Centre, European Laboratory for Structural Assessment, FP5 Project ENK5-CT-2000-00328, Document No. MEGA/DL2/03, Jul. 11, 2003, pp. 1-168.*

* cited by examiner

*Primary Examiner* — Jeff Aftergut

(74) *Attorney, Agent, or Firm* — James McGinness, Esq.; Armstrong Teasdale LLP

(57) ABSTRACT

A method for fabricating a tower or component thereof for use with a wind turbine is disclosed. The method comprises weaving a fibrous tow in a shape corresponding to the shape of the tower or component to form a flexible textile preform; and laminating the flexible textile preform to form a composite shell. Also disclosed is a wind turbine assembly comprising a composite wind turbine tower and a wind turbine coupled to the tower.

13 Claims, 8 Drawing Sheets

COMPOSITE WIND TURBINE TOWER AND A METHOD FOR FABRICATING SAME

BACKGROUND OF THE INVENTION

The field of the disclosure relates generally to wind turbine towers and more particularly, to a composite wind turbine tower and a method for fabricating same.

Known wind turbines include a rotor that includes multiple blades. The rotor is mounted within a housing or nacelle that is positioned on top of a truss or tubular tower. The rotor blades transform wind energy into a rotational force or torque that drives one or more generators that are generally, but not always, rotationally coupled to the rotor through a gearbox. In instances where a gearbox is used, the gearbox steps up the inherently low rotational speed of the turbine rotor for the generator to enable the mechanical energy to be efficiently converted to electrical energy. In other instances, low speed generators are used to generate power without the use of a gearbox.

To increase wind turbine power production and reduce the cost of energy, at least some known wind turbines use large-sized blades (e.g., 50 meters or more in length). The larger blade size results in an increased turbine power rating and more efficient energy production. The larger blades require a supporting tower having a corresponding increased height and size. However, the production of larger wind turbine towers is limited by the horizontal dimension at the base of the tower, the need for a thicker (heavier) plate, and increased manufacturing costs. Currently, most known turbine towers are welded tubular plate steel structures. Such plate steel structures typically use large amounts of steel, which increase material costs. Additionally, large tubular towers require special manufacturing equipment, and may be cumbersome and difficult to transport from the site of manufacture to the turbine assembly site.

BRIEF DESCRIPTION OF THE INVENTION

In one aspect, the present disclosure is directed to a method for fabricating a tower or component thereof for use with a wind turbine. The method comprises weaving a fibrous tow in a shape corresponding to the shape of the tower or component to form a flexible textile preform; and laminating the flexible textile preform to form a composite shell or a section thereof.

In another aspect, the present disclosure is directed to a wind turbine assembly comprising a composite wind turbine tower and a wind turbine coupled to the tower. The tower comprises a first textile composite layer, a second textile composite layer, and a layer of a core material. The tower has a tensile modulus of from about 5 GPa to about 300 GPa.

DETAILED DESCRIPTION OF THE INVENTION

Figure 1:
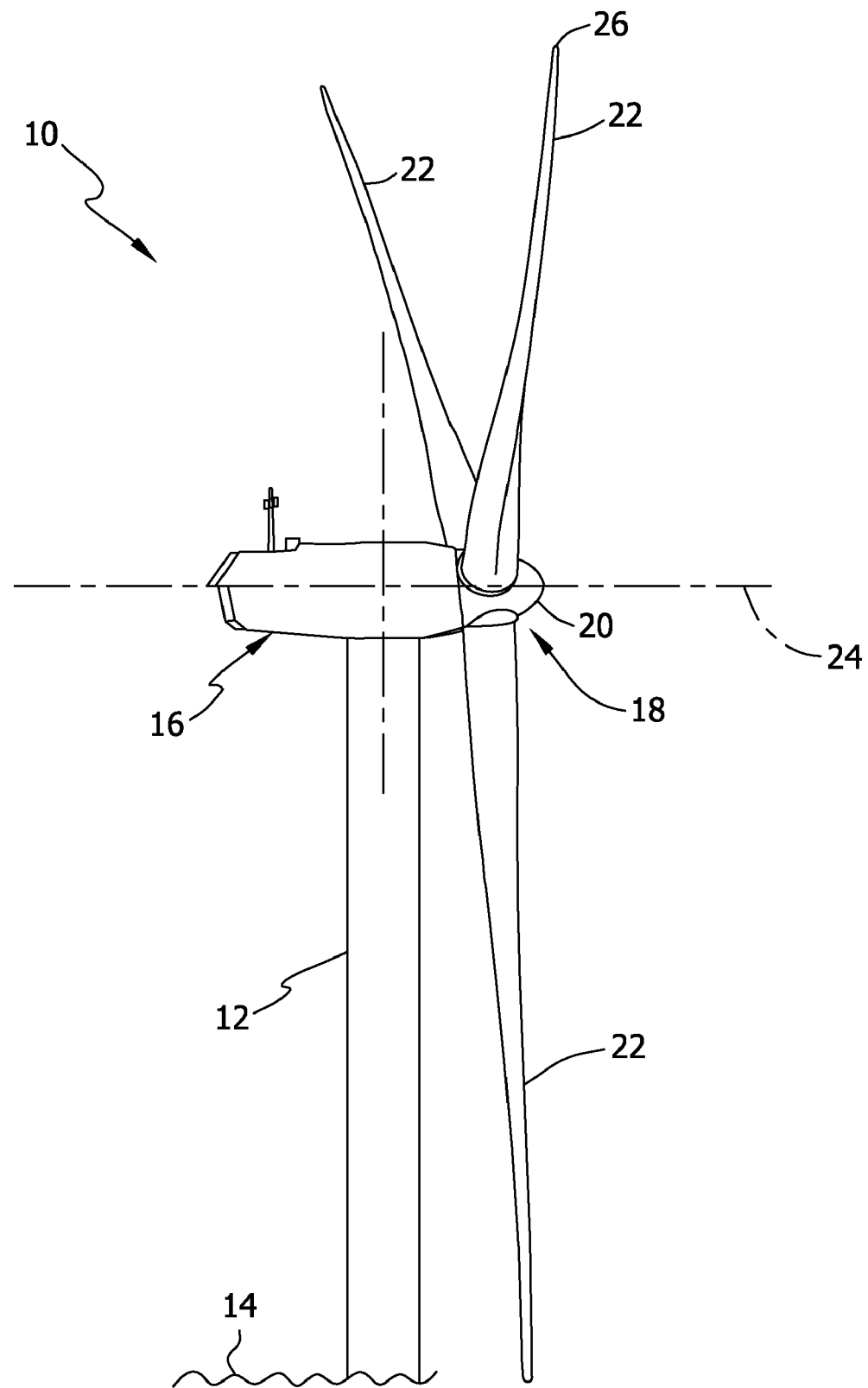
FIG. 1 is a perspective view of an exemplary wind turbine.

FIG. 1 is a perspective view of an exemplary wind turbine assembly 10. In the exemplary embodiment, wind turbine assembly 10 is a horizontal-axis wind turbine. Alternatively, wind turbine assembly 10 is a vertical-axis wind turbine. Wind turbine assembly 10 in the exemplary embodiment includes a tower 12 extending from a supporting surface 14, a nacelle 16 mounted to tower 12, and a rotor 18 coupled to nacelle 16. Rotor 18 includes a rotatable hub 20 and a plurality of wind turbine or rotor blades 22 coupled to hub 20. In the exemplary embodiment, rotor 18 includes three rotor blades 22. In an alternative embodiment, rotor 18 includes more or less than three rotor blades 22. A center line 24 extends through nacelle 16 and hub 20. Each rotor blade 22 includes a tip 26. In the exemplary embodiment, tower 12 is a composite tower fabricated from carbon fibers, fiberglass, or any other suitable material that enables tower 12 to function as described herein, and may include a cavity (not shown in FIG. 1) that extends between supporting surface 14 and nacelle 16. A height of tower 12 is selected based upon factors and conditions known in the art. Blades 22 are spread about rotor hub 20 to facilitate rotating rotor 18 to transfer kinetic energy from the wind into usable mechanical energy, and subsequently, electrical energy.

Figure 2:
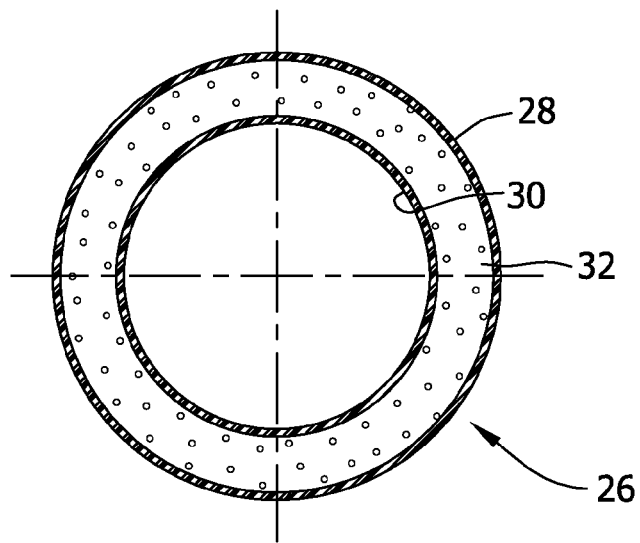
FIG. 2 is a cross-sectional view of an exemplary multi-layered composite shell that may be used with the wind turbine shown in FIG. 1.
Figure 3:
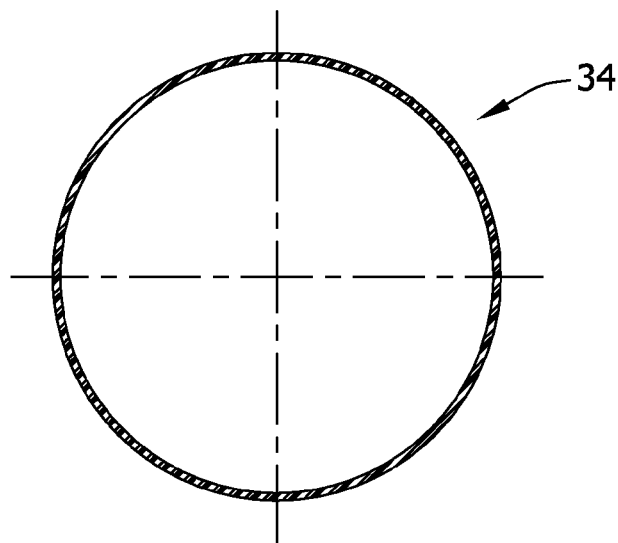
FIG. 3 is a cross-sectional view of an exemplary single layered composite shell that may be used with the wind turbine shown in FIG. 1.
Figure 4:
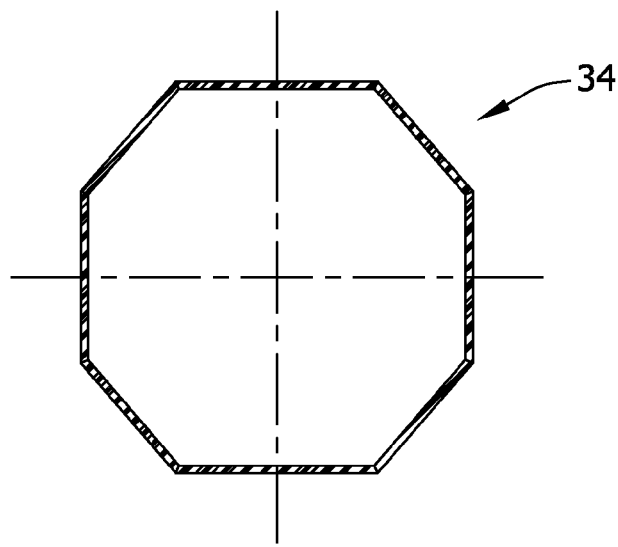
FIG. 4 is a cross-sectional view of an exemplary single layered polygonal composite shell that may be used with the wind turbine shown in FIG. 1.

Exemplary cross sectional views of tower 12 are illustrated generally in FIGS. 2-4. In the exemplary embodiment, tower 12 includes a composite shell 26 and 34, which may be fabricated using one or more layers of a textile composite 28 and 30 that are laminated with a resin (not shown), such as, but not limited to, an epoxy, a vinylester, a polyester resin, a phenolic resin, a polypropylene, or combinations thereof. As used herein, the term "textile composite" refers to a composite material formed by weaving together one or more suitable material(s), such as, but not limited to, metals, plastics, woods, and/or fibers, such as, but not limited to, glass fibers (i.e., fiberglass), carbon fibers, and/or aramid fibers, as described herein. Composite shell 26 may also include other component layers that are laminated with one or more textile composite layer(s) 28 and 30. For example, as illustrated in FIG. 2, composite shell 26 may be a multi-layered composite shell that includes a core material 32 sandwiched between an inner textile composite layer 30 and an outer textile composite layer 28 that facilitates strengthening of composite shell 26 and/or tower 12 against buckling due to wind or operational loading.

Although FIG. 2 illustrates a multi-layered composite shell 26 that includes three layers, i.e., an outer textile composite 28, an inner textile composite 30, and a core material 32 sandwiched between composites 28 and 30, composite shell 26 may alternatively include any combination of layers, including any number of textile composite layers such as layers 28 or 30, and/or layers of core material such as core material 32. For instance, although only one layer of core material 32 is shown in FIG. 2, and although core material 32 is shown as sandwiched between two adjacent textile composites 28 and 30, a multi-layered composite shell, such as composite shell 26, may include any number of layers of core material 32 that enables composite shell 26 to function as described herein.

For example, in an alternative embodiment, the composite shell may be a single layer composite shell 34 as illustrated in FIGS. 3 and 4. In such an exemplary embodiment, composite shell 34 may include a single textile composite layer 28 or 30 and no core material 32.

In one embodiment, a method for fabricating a wind turbine tower 12 includes weaving a fibrous tow around a mandrel 38 that has a shape corresponding to a desired shape of the composite shell, to form a flexible textile preform. The flexible textile preform is a precursor of the composite shell, and as such, generally has the same configuration as the composite shell. For example, the flexible textile preform may include a single layer of material (e.g., a textile composite), such as flexible textile preform 36 illustrated in FIG. 5, or alternatively, may include two or more layers of material (not shown), depending on the desired configuration of the composite shell. The flexible textile preform is then transported to a tower assembly site wherein it is laminated to form the composite shell. The composite shell may be used alone as a composite wind turbine tower or may be used as a part of a composite wind turbine tower.

Alternately, the flexible textile preform may be a precursor of only a section of the composite shell. For example, the flexible textile preform may correspond to a lower, middle, and/or upper section of the composite shell, or may be in the form of a panel which may be laminated to form one or more sides (or portion of a side) of the composite shell. For example, in one embodiment, the flexible textile preform corresponds to one side of a polygonal composite shell, as shown in FIG. 4. When the flexible textile preform corresponds to a section of a composite shell, the preform may be formed by weaving a fibrous tow around a mandrel having a shape corresponding to the shape of the section of the composite shell being formed. Alternatively, the preform may be formed without the use of a mandrel by weaving the fibrous tow into a relatively flat shape, e.g., the shape of a panel which may form a side or portion of a side of the composite shell. Once laminated, the sections may be assembled to form the composite shell.

As described above, in an exemplary embodiment, the flexible textile preform may be formed by weaving a fibrous tow around a mandrel 38, to form, for example, a textile composite. As used herein, the term "fibrous tow" refers to a bundle of filaments of a material(s) that is woven about the mandrel to form a textile composite. The material used to form the fibrous tow may include any suitable material for use in forming textile composite 28 and/or 30 including, but not limited to, metals, plastics, woods, and/or fibers, such as, but not limited to, glass fiber (i.e., fiberglass), carbon fiber, aramid fiber, or combinations thereof. Specific examples of suitable carbon fibers include T300 carbon fiber, AS2C carbon fiber, AS4 carbon fiber, AS4C carbon fiber, AS4D carbon fiber, AS7, carbon fiber IM9 carbon fiber, and the like. In one embodiment, the carbon fiber is T300 carbon fiber. Other examples of suitable materials that may be used in the fibrous tow include Kevlar® 49, SCS-6, S2 glass, E-glass, silicone carbide fibers such as Nicalon™ fibers (available from Nippon Carbon Company), alumina, and combinations thereof. Typically, the fibrous tow will have a size of from about 1,000 to about 80,000, and more typically from about 12,000 to about 80,000 (i.e., will be a bundle containing from about 12,000 to about 80,000 filaments).

Figure 12:
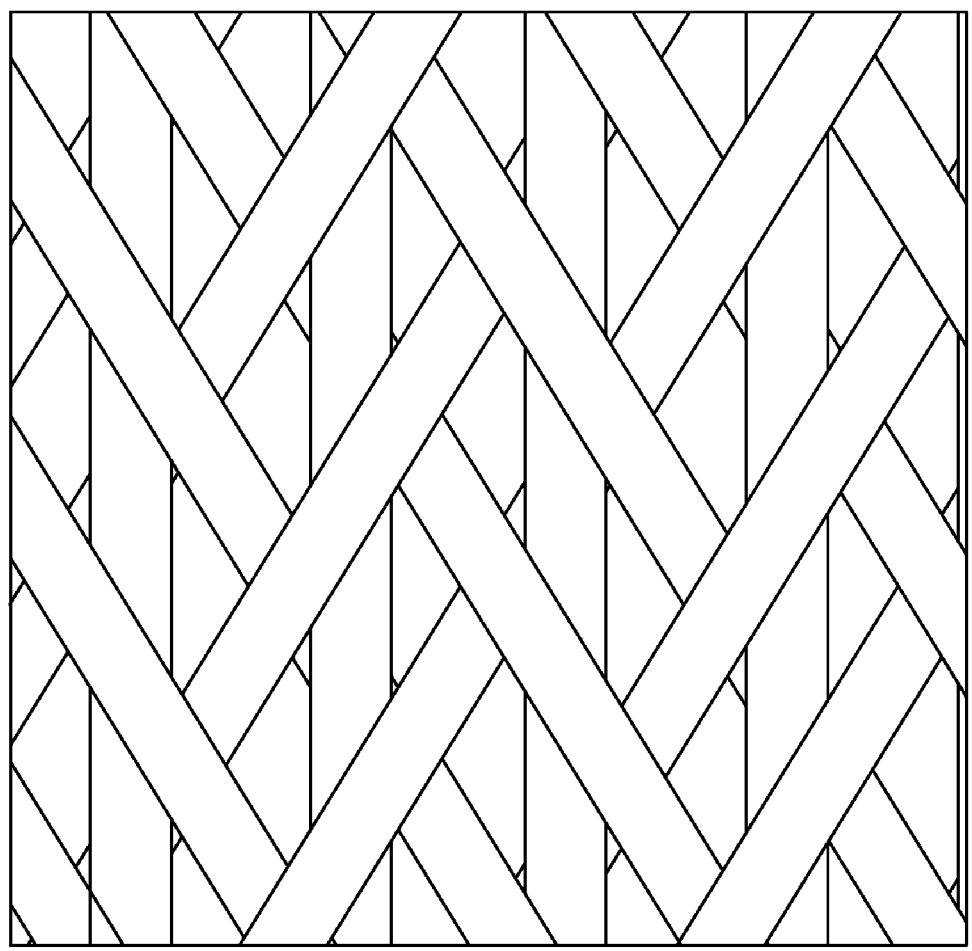
FIG. 12 is an enlarged illustration of an exemplary triaxial braid.

The specific mechanism by which the fibrous tow is woven is not specifically defined, but typically is dependent on the load a composite shell having a particular geometrical shape is designed to bear. Preferably the tow will be woven such that the textile composite (and the flexible textile preform) substantially maintains its shape (i.e., will not unravel) when removed from the mandrel 38. Typically, the weave is achieved by braiding the tow either biaxially or triaxially. An exemplary illustration of the structure of a triaxial braid is shown in FIG. 12. The tow may furthermore be braided into a two-dimensional layer and/or a three-dimensional layer, depending on the desired properties of the tower 12. Suitable braiding machines are known in the art and are commercially available.

Figure 13:
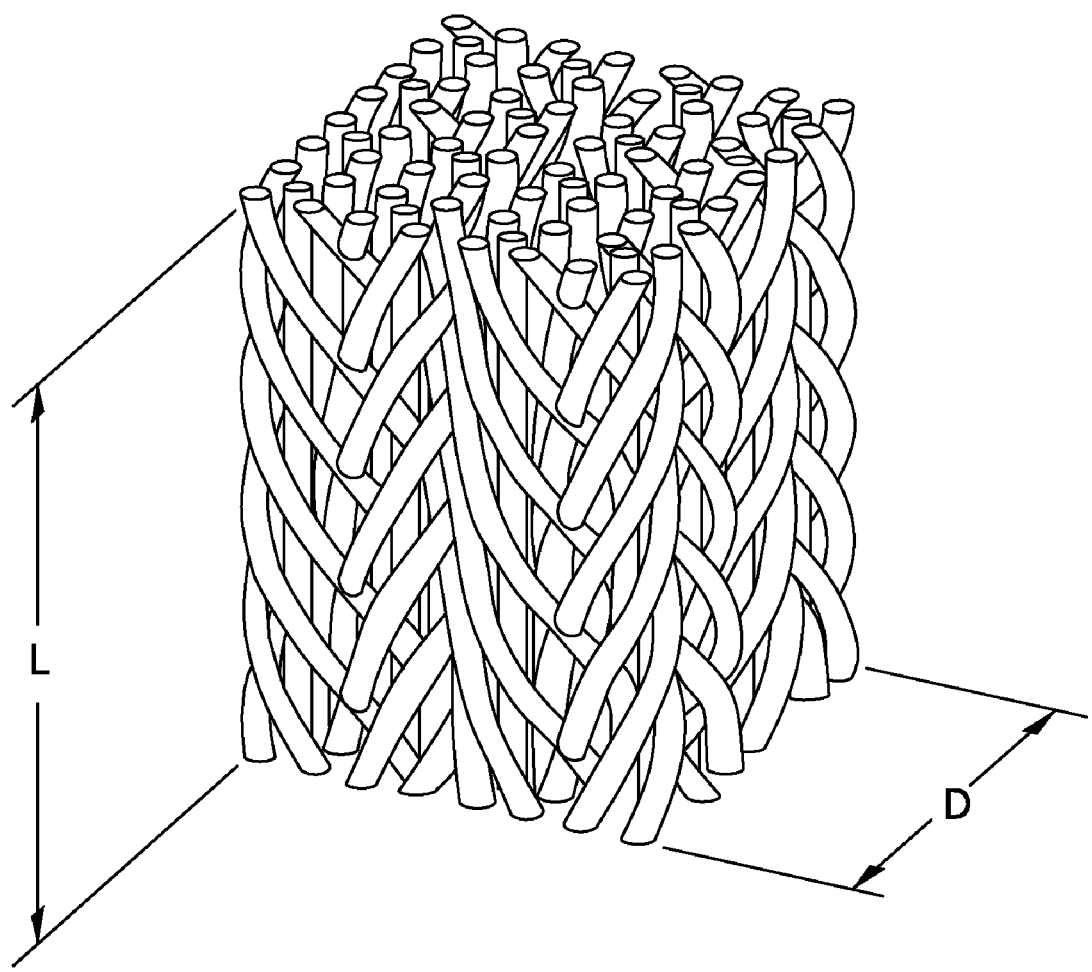
FIG. 13 is an enlarged illustration of a portion of an exemplary three-dimensional layer of a textile composite.

FIG. 13 illustrates a portion of an exemplary three-dimensional layer of a textile composite. A three-dimensional layer of textile composite will typically include regions of constant or uniformly varying inter-woven patterns and/or dimensions in the longitudinal direction L (i.e., direction corresponding to height of the tower or composite shell formed from the textile composite). The inter-woven patterns and/or dimensions of the three-dimensional layer of textile composite may vary along longitudinal direction L, as a function of height. For instance, the three-dimensional layer of textile composite may have a different dimension and/or inter-woven pattern in the portion of the textile composite that will become (or become part of) a lower (base) section of the composite shell than it will in the portion of the layer that will become (or become part of) an upper (top) section of the composite shell. Typically, the three-dimensional layer of textile composite will include a uniform, repeating inter-woven pattern of a constant depth D around the circumference or perimeter of the textile composite at any given height along longitudinal direction L.

As described above, in the exemplary embodiment, the flexible textile preform is a precursor of the composite shell, and as such, will generally have the same layer configuration as the composite shell. For example, in embodiments where composite shell 34 includes only a single layer, such as a single textile composite, as is illustrated in FIGS. 3 and 4, the flexible textile preform will also include only a single layer of textile composite, formed from woven tow. In embodiments where composite shell 26 includes multiple layers, such as is illustrated in FIG. 2, the flexible textile preform will also include multiple layers of textile composite formed from woven tow and/or layer(s) of core material.

When the flexible textile preform includes only a single layer of textile composite, it is generally preferable for the layer to be a three-dimensional layer, such as is illustrated in FIG. 13. Typically, in such embodiments, the layer will be at least 2 mm thick, and more typically will be from about 3 mm to about 10 mm. Preferably, the layer will be from about 6 mm to about 8 mm thick. In such an embodiment, composite shell 34 formed from the flexible textile preform will typically not include a core material, but rather, will include only a single layer of a textile composite.

In another embodiment, the flexible textile preform includes multiple layers. For example, the flexible textile preform may include at least two layers of textile composite. Such a multi-layered preform may be formed by weaving a first, inner layer around the mandrel. A second layer may then be woven around the first inner layer to form a multi-layered preform. It should be understood that additional layers may optionally be woven around the second layer to form a preform comprising a plurality of layers of textile composite. In some embodiments, the layers that make up the preform may be held together by stitching the ends of the layers together. Such stitching facilitates preventing the layers from slipping or separating during transport to the tower assembly site. The layers of the multi-layered preform may be two-dimensional or three-dimensional. In one embodiment, the multi-layered preform includes two or more two-dimensional layers. A thickness of each layer of textile composite in a multi-layered preform may be the same or different than other layers in the preform, but typically each layer of textile composite has a thickness of at least about 2 mm, and more typically from about 3 mm to about 10 mm. Preferably, the layer of textile composite in the multi-layered preform will have a thickness of from about 6 mm to about 8 mm.

In some embodiments, the multi-layered preform includes one or more layers of core material. The core material may be positioned between one or more layers of textile composite. The core material is typically a solid, light weight, stiff or semi-stiff material that supports the layers of textile composite in a composite shell. Suitable core material for use in formation of a composite shell includes, but is not limited to, balsa wood, polyvinyl chloride (PVC) foam, styrene acryl nitrate (SAN) foam, polyethylene (PE) foam, a metal honeycomb, such as, but not limited to, an aluminum honeycomb, a fabric such as, but not limited to, a polyester core mat, and combinations thereof. The layer(s) of core material present in the flexible textile preform may have any suitable thickness that enables the core material to function as described herein. For example in one embodiment, the core material layer is typically from about 5 mm to about 100 mm.

One or more layers of core material may be positioned between one or more layers of textile composite, in any desirable orientation or configuration, to form the multi-layer flexible textile preform. For example, in one embodiment, the flexible textile preform may include a first, inner layer of textile composite, a second, outer layer of textile composite, and at least one layer of core material positioned between the inner and outer layers of textile composite. A cross-sectional view of a composite shell formed from such a flexible textile preform is shown in FIG. 2. Such a preform may be formed by weaving the first layer around the mandrel to form the first, inner layer of textile composite. One or more layers of core material may then be positioned adjacent to the first, inner layer. The core material may be held in position adjacent to the first, inner layer of textile composite using any suitable mechanism. For example, in one embodiment, the core material may be stitched to the first, inner layer. Alternatively, or in addition to stitching, the core material may be held adjacent to the first, inner layer of textile composite using an adhesive and/or other binding material.

As noted above, the core material is typically a solid, stiff or semi-stiff material. While this stiffness is beneficial in providing support to the composite shell, incorporating such material into the preform structure may reduce the overall flexibility of the flexible textile preform. Consequently, depending on the stiffness of the core material, the preform may be difficult to bend and/or fold. This may be problematic, especially during preform transport, where it may be desirable to collapse and/or fold the preform. Thus, in some embodiments, each layer of core material in the preform may include multiple, unconnected pieces of core material. Typically, adjacent pieces of core material will be spaced sufficiently far enough apart to enable the preform to be able to bend or fold along the spaces between core material pieces, thus improving the flexibility of the flexible textile preform. By forming a layer of core material, from multiple, unconnected pieces of core material rather than from a single, continuous piece of core material, the flexibility of the resulting flexible textile preform may be increased because the preform can bend or fold along the spaces defined between adjacent core material pieces. Each piece of core material in the layer of core material may be positioned adjacent to the first, inner layer of textile composite using any suitable mechanism. Moreover, the number of pieces of core material used in a layer of core material is not critical, but rather will vary depending on the desired degree of flexibility of the flexible textile preform.

Once a layer of core material has been positioned adjacent to the first, inner layer of textile composite, a second layer of textile composite may then be woven around the core material to form the flexible textile preform. A preform of this type may be used to form a composite shell, such as is illustrated in FIG. 2. It should be understood that a multi-layered, flexible textile preform of the present disclosure is not limited to only being a three-layered structure, but alternatively may further include one or more additional layers of textile composite and/or core material incorporated into the preform in any suitable layer configuration. For example, in one embodiment, one or more additional layers of textile composite are woven around the first, inner layer of textile composite, and the layer of core material is positioned adjacent to the one or more additional layers of textile composite. In another embodiment, one or more additional layers of textile composite are woven around the second layer of textile composite. In a further embodiment, one or more layers of core material are positioned adjacent to the first layer of core material, and the second, outer layer of textile composite is wound around the outer layer of core material to form a multi-layered flexible textile preform. In other embodiments, a second layer of core material is positioned adjacent to the second layer of textile composite, and a third layer of textile composite is then woven around the second layer of core material to form a flexible textile preform. Other suitable layer configurations may also be used.

After the flexible textile preform is formed, the flexible textile preform may be transported to a tower assembly site for formation of the composite shell. In one embodiment, the flexible textile preform may be removed from the mandrel prior to transporting. Because the preform is flexible, once removed from the mandrel it may then be readily collapsed, folded, stacked, or otherwise manipulated, to facilitate the transportation to the tower assembly site. In such embodiments, after arriving at the tower assembly site, the flexible textile preform is slipped onto a second mandrel, and laminated, as described below, to form the composite shell.

In an alternative embodiment, the flexible textile preform is formed around an inflatable mandrel. Prior to transporting the flexible textile preform to the tower assembly site, the mandrel is deflated, without removing the preform from the mandrel. Deflating the mandrel allows the preform to be more easily manipulated and transported. Once at the assembly site, the mandrel is then reinflated, and the flexible textile preform is laminated, as described below, to form the composite shell.

Figure 5:
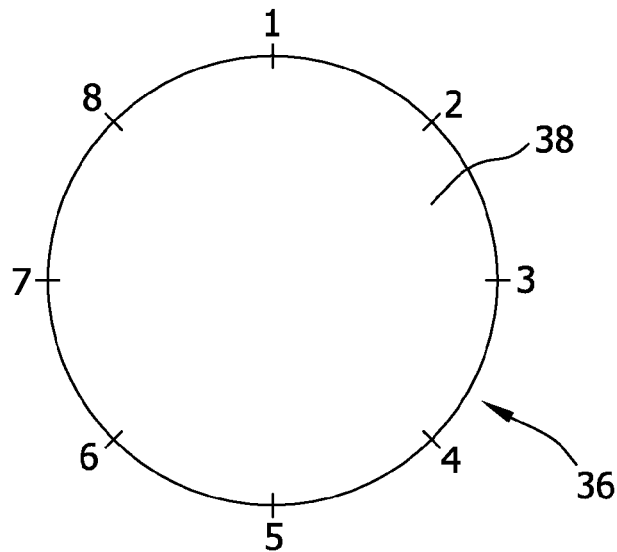
FIG. 5 is a cross-sectional view of an exemplary single layered flexible textile preform on a mandrel.
Figure 6:
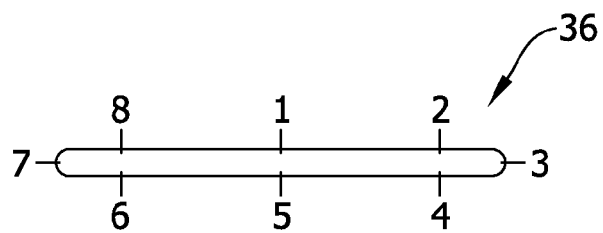
FIG. 6 is a cross-sectional view of the flexible textile preform shown in FIG. 5 and laying flat.
Figure 7:
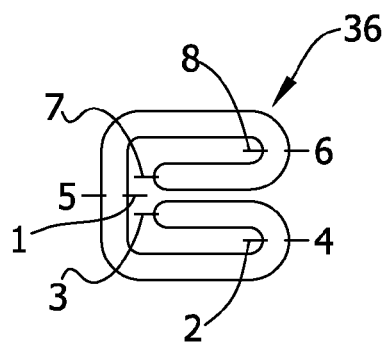
FIG. 7 is a cross-sectional view of the flexible textile preform shown in FIG. 6 and in a folded or "collapsed" configuration.

The transportation of a flexible textile preform to a tower assembly site is illustrated in FIGS. 5 to 11. Specifically, FIG. 5 is a cross sectional view of a flexible textile preform 36 that may be used to form a circular tower, and that includes a single layer of material, such as a textile composite, woven around mandrel 38. Flexible textile preform 36 has been marked with reference points 1-8 to illustrate exemplary folding of flexible textile preform 36. Once removed from mandrel 38, flexible textile preform 36 may be collapsed to lay flat. FIG. 6 is a cross-sectional view of an exemplary flexible textile preform 36 laying flat. As shown in FIG. 6, in the exemplary embodiment, reference point 8 aligns with reference point 6, reference point 1 aligns with reference point 5, reference point 2 aligns with reference point 4, and reference points 3 and 7 form the ends of collapsed flexible textile preform 36. Once collapsed, flexible textile preform 36 may be folded in any suitable configuration prior to transport to the tower assembly site. FIG. 7 depicts a cross-sectional view of flexible textile preform 36 folded in an exemplary configuration.

Figure 8:
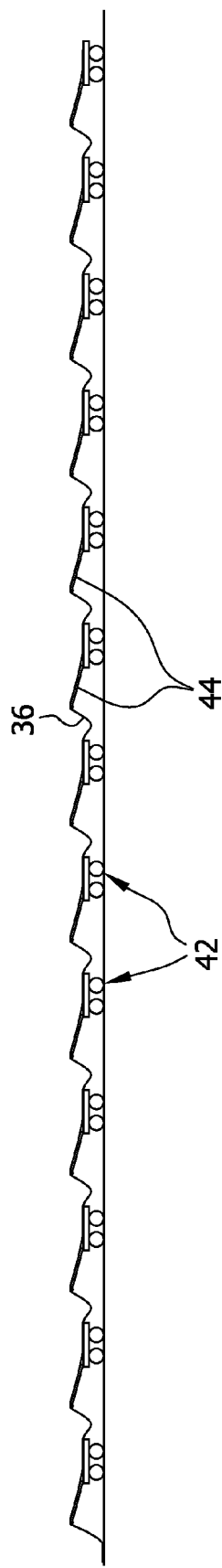
FIG. 8 is a side view of a collapsed flexible textile preform loaded onto shipping trolleys with their trolley arms lowered.
Figure 9:
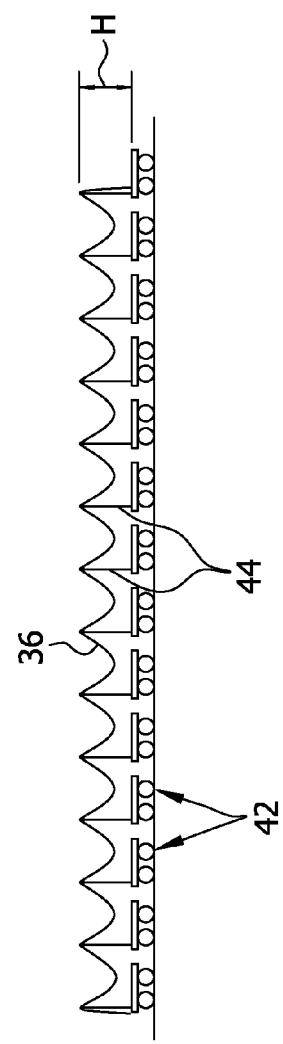
FIG. 9 is a depiction of a collapsed flexible textile preform loaded onto shipping trolleys with their trolley arms raised.

Flexible textile preform 36 may be transported to the tower assembly site, for example, by truck, ship, rail, and the like, or combinations thereof. Flexible textile preform 36 may also be transferred to a shipping container or trailer 40 of a truck for transport to the tower assembly site. In one embodiment, flexible textile preform 36 is transferred into a shipping container or truck trailer 40 using shipping trolleys 42, as shown FIGS. 8-9. Specifically, as shown in FIG. 8, flexible textile preform 36 is laid over a series of individual shipping trolleys 42 when trolley arms 44 are lowered. When laid over shipping trolleys 42, flexible textile preform 36 is collapsed, and may be unfolded, as shown in FIG. 6, or may be folded in any suitable configuration, as shown in FIG. 7. In one embodiment, trolley arms 44 are simultaneously rotated into an upright position using controlled hydraulic actuation, such that each shipping trolley 42 supports a portion of flexible textile preform 36, as shown in FIG. 9. Alternatively, trolley arms 44 may be raised using motorized telescoping bracing (not shown). Shipping trolleys 42 supporting flexible textile preform 36 may be moved into a shipping container or truck trailer 40, for transport of flexible textile preform 36 to the tower assembly site. As shown in FIG. 9, the portions of flexible textile preform 36 that span between two adjacent shipping trolleys 42 become folded as shipping trolleys 42 are moved closer together for loading into a shipping container or truck trailer 40. The number of shipping trolleys 42 used to transport flexible textile preform 36 is not critical, but typically a sufficient number is used to ensure the folded height H of flexible textile preform 36 does not exceed the standard height of the shipping container or truck trailer 40. For example, in one embodiment, twelve to fourteen trolleys 42 are used. In another embodiment, thirteen trolleys 42 are used. Each shipping trolley 38 may support from about 1 tonne to about 3 tonnes of the weight of flexible textile preform 36, depending on the shape of flexible textile preform 36 and variations in wall thickness of flexible textile preform 36.

Alternatively, a jib or bridge crane and a folding lift beam (not shown) may be used to position flexible textile preform 36 onto shipping trolleys 42. For example, as a folding lift beam lifts an end of flexible textile preform 36, an upright shipping trolley 42 is positioned under the lifting beam. The beam is then lowered and flexible textile preform 36 is then transferred to shipping trolley 42. This procedure is repeated for the remaining shipping trolleys 42. Using this procedure enables flexible textile preform 36 to be folded during each lift cycle, and eliminates the need for trolley hydraulics or motorized telescoping bracing.

Figure 10:
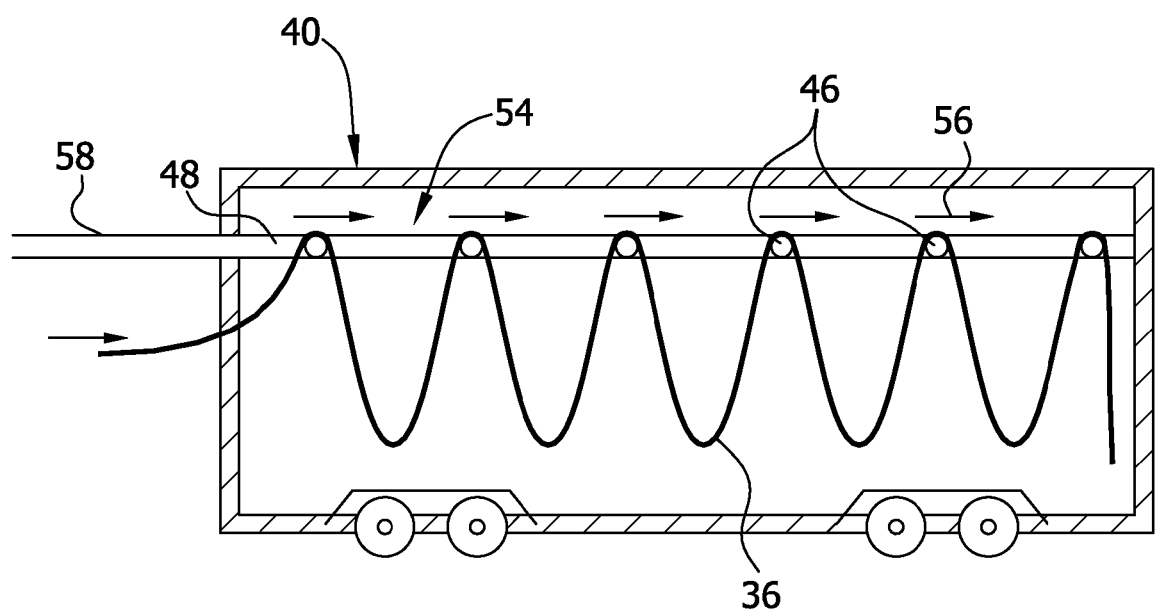
FIG. 10 is a cross-sectional side view of a truck trailer with a flexible textile preform being loaded onto roller trolleys within tracks mounted on the interior and opposite sides of the truck trailer.

In other embodiments, flexible textile preform 36 may be supported by a plurality of coordinated roller trolleys 46 which are mounted within and run along tracks 48 which are mounted on the interior and opposite upper sides 54 of shipping container or truck trailer 40, as is illustrated in FIG. 10. In one embodiment, a collapsed or folded flexible textile preform 36 is laid across loading rails 58 and roller trolleys 46 using, for example, a crane or other suitable mechanism. Roller trolleys 46 are then mounted onto tracks 48 in shipping container or truck trailer 40. Alternately, roller trolleys 46 may be premounted on tracks 48 in shipping container or truck trailer 40, and flexible textile preform 36 may be loaded into truck trailer 40 by rolling flexible textile preform 36 over roller trolleys 46 that are premounted onto tracks 48, in a direction indicated by arrows 56 shown in FIG. 10. The portions of flexible textile preform 36 that span between adjacent roller trolleys 46 become folded as roller trolleys 46 are moved close together. Loading rails 58 are removed prior to transport.

Figure 11:
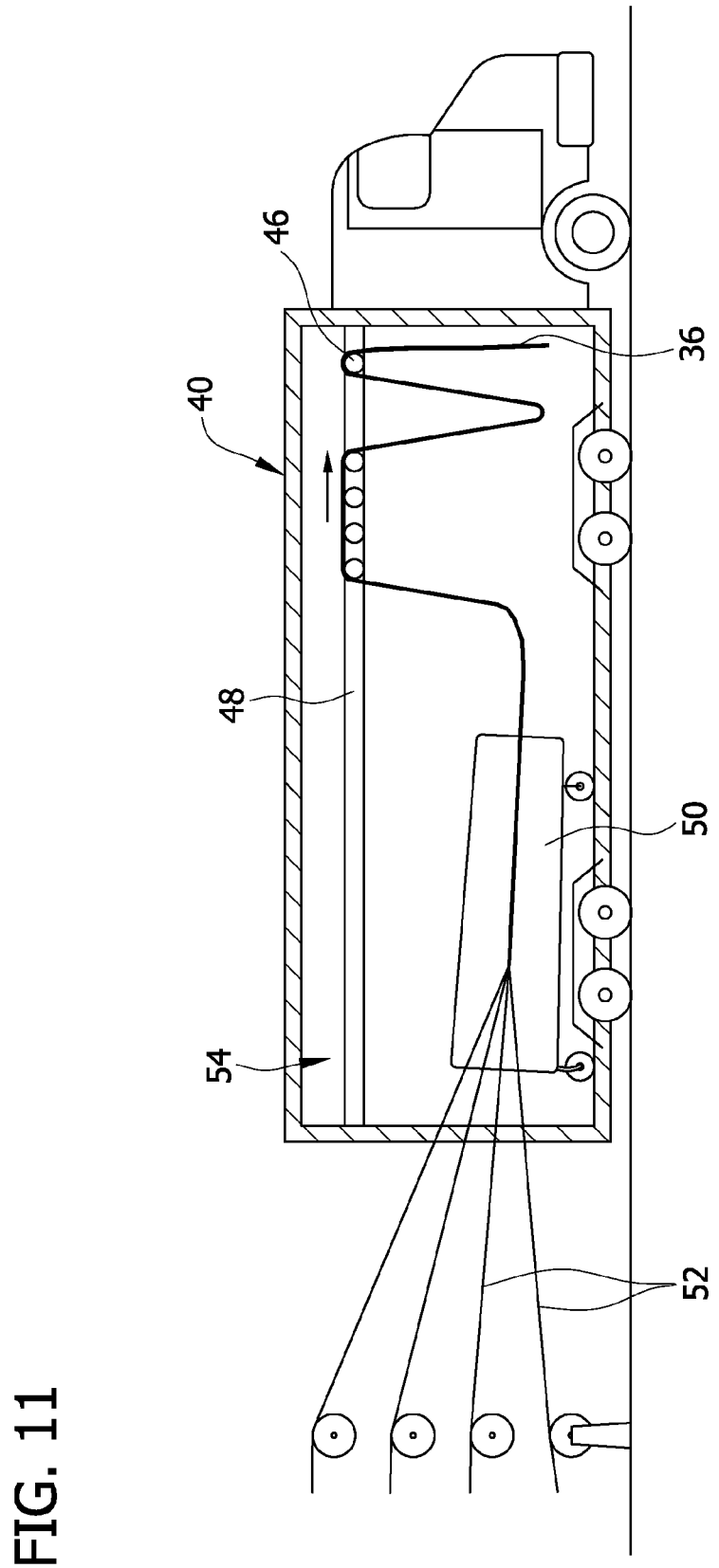
FIG. 11 is a cross-sectional view of a truck trailer with a flexible textile preform being formed in the truck trailer and loaded onto roller trolleys within tracks mounted on the interior and opposite sides of the truck trailer as the preform is being manufactured.

In an alternative embodiment, flexible textile preform 36 may be formed as it is loaded into shipping container or truck trailer 40, as illustrated in FIG. 11. In such an embodiment, a braiding machine 50 may be positioned inside shipping container or truck trailer 40, as is illustrated in FIG. 11, or just outside shipping container or truck trailer 40 (not shown). Fibrous tow 52 is fed into braiding machine 50, where it is wound around a portable mandrel (not shown) to form flexible textile preform 36. In this embodiment, the portable mandrel will typically not be as long as the desired length of flexible textile preform 36. Thus, to form a flexible textile preform 36 having a length longer than that of the portable mandrel, the portion of flexible textile preform 36 that has been formed is slipped off of the end of the portable mandrel such that the other end of the portable mandrel is exposed. Fibrous tow 52 may thus continue to be woven around the exposed end of the portable mandrel. This procedure may be continued until a desired length of flexible textile preform 36 is obtained. In such an embodiment, as the formed end of flexible textile preform 36 is removed from the portable mandrel, it may be supported by roller trolleys 46 or alternately, by shipping trolleys (not shown).

Once loaded into shipping container or truck trailer 40, flexible textile preform 36 is transferred to the tower assembly site to enable the formation of the composite shell. Once at the assembly site, flexible textile preform 36 is unloaded from shipping container or truck trailer 40, slipped onto a second mandrel, and laminated, as described below, to form the composite shell. Alternatively, in embodiments where an inflatable mandrel is used, flexible textile preform 36 is unloaded from shipping container or truck trailer 40, the mandrel is reinflated, and flexible textile preform 36 is laminated to form the composite shell.

Once flexible textile preform 36 has been slipped onto the second mandrel, or alternately, the inflatable mandrel has been reinflated, flexible textile preform 36 is infused with a resin or a resin is otherwise applied to flexible textile preform 36, and flexible textile preform 36 is laminated to bind the layer or layers of preform 36 together, forming the composite shell of tower 12. Any suitable lamination process may be used, such as, but not limited to, a resin transfer molding (RTM) process, a resin film infusion (RFI) process, a vacuum assisted resin transfer molding (VARTM) process, heating a resin-infused preform for any suitable time at any suitable temperature, and/or application of pressure to a resin-infused preform. In some embodiments, the resin is infused into preform 36 using pressure, heat, and/or a vacuum bag system such as that used with a resin transfer molding process. Moreover, in some embodiments, woven preform layers and/or layers of core material present in preform 36 are coated with resin prior to weaving and/or positioning on the mandrel. The resin used to laminate preform 36 may include any thermoplastic or thermosetting resin including, for example, polyester, phenolic resins, polypropylene, vinyl ester, epoxy, other similar resins, or combinations thereof. In one embodiment, the resin is applied to preform 36 prior to lamination in an amount of from about 45% to about 48% by volume fraction of the composite shell.

Following lamination, the composite shell may be removed from the mandrel using any suitable technique. For instance, the mandrel may be coated with a release film prior to slipping the flexible textile preform over the mandrel to aid removal of the composite shell from the mandrel. A non-limiting example of a suitable release film includes various water-soluble polymeric/wax emulsions. In another embodiment, such as when the mandrel is an inflatable mandrel, the mandrel may be deflated and the composite shell removed from the deflated mandrel. In still other embodiments, the mandrel may be left inside the composite shell following lamination and become part of the finished composite wind turbine tower.

As noted above, in some embodiments, the flexible textile preform is a precursor to a section of the composite shell. In such embodiments, once transported to the tower assembly site, the flexible textile preform precursor sections are laminated using any suitable technique, and the laminated pieces are then assembled to form the composite shell.

The composite shell formed using the methods described herein may be used in forming a composite wind turbine tower. The composite wind turbine towers described herein may be used to support any sized wind turbine, including for example, GE Energy's 4-7 MW design. Advantageously, the composite wind turbine tower has strength characteristics that are comparable to steel towers. For instance, in some embodiments, a composite wind tower of the present disclosure will advantageously allow for a yield strength in the range of about 70 MPa to about 900 MPa. The actual strength of such a tower can vary depending on the wall thickness, fiber content, fiber orientation, and fiber material. Generally, the composite wind turbine tower is also a lighter weight than conventional steel towers, while still having good strength. For example, the composite wind turbine tower produced using the methods described herein may have a tensile modulus of from about 5 GPa to about 300 GPa, and more typically from about 20 GPa to about 200 GPa, while having a very low tower weight. The improved tensile modulus of the composite wind turbine tower also results in a tower having an increased frequency range, which makes the tower less prone to excitation modes under varying turbine operational and wind loads. Typically, the first natural frequency for the composite wind turbine tower is from about 0.1 Hz to about 2 Hz, and more typically is from about 0.2 Hz to about 0.6 Hz.

The thickness of the wall of the composite shell will vary, depending on the materials used to form the composite shell. In one embodiment, the composite shell is formed from a single layer flexible textile preform and has a wall thickness of at least about 10 millimeters, and more typically at least about 20 millimeters. In other embodiments, the composite shell is formed from a multi-layer flexible textile preform and has a wall thickness of at least about 20 millimeters, and more typically has a wall thickness of from about 20 millimeters to about 150 millimeters. The thickness of the wall of the composite shell may also vary within a single composite shell. For instance, a bottom end of the composite shell, which forms the base of the composite tower, will typically be thicker than a top end of the composite shell.

The composite shell may have any suitable shape. In one exemplary embodiment, the composite shell is generally conical, and has a circular cross sectional profile, as is illustrated in FIGS. 2 and 3. In other embodiments, the composite shell has a polygonal cross sectional profile, as is illustrated in FIG. 4. The exact dimensions of the composite shell are not critical to describe the present invention. Typically, however, the composite shell will have a diameter at the base of about 2 meters to about 20 meters, and more typically about 3.5 meters to about 5 meters, and a diameter at the top of from about 2 meters to about 6 meters, and more typically about 2.5 meters to about 3.5 meters. In one exemplary embodiment, the composite shell may have a length (height) of from about 10 meters to about 150 meters, and more typically about 80 meters to about 100 meters. The weight of a composite shell formed using the methods described herein will vary depending on the composite shell dimensions and materials used to form the flexible fibrous preform, but typically will be from about 40 metric tons to about 500 metric tons, and more typically about 50 metric tons to about 90 metric tons. The weight of the flexible fibrous preform prior to lamination may be from about 30 metric tons to about 320 metric tons, and more typically is about 30 metric tons to about 70 metric tons.

In another aspect, the present disclosure further provides a wind turbine assembly, such as is depicted in FIG. 1. The wind turbine assembly includes a composite wind turbine tower, which includes the composite shell as described herein, and a wind turbine. The wind turbine is coupled to the tower to form the wind turbine assembly.

By using the wind turbine tower and methods of producing the wind turbine tower as described herein, a wind turbine tower that can be easily assembled at the tower installation and assembly site can be produced. Furthermore, as noted above, by producing a wind turbine tower in this manner, towers can be produced more efficiently and at a lower cost than conventional wind turbine towers that require large quantities of steel and have expensive material and manufacturing costs. Additionally, transporting a flexible textile preform to the tower assembly site and laminating the preform on-site to produce a composite wind turbine tower is easier and more cost effective than transporting pre-manufactured towers. In some embodiments, the wind turbine towers described herein eliminate the need for intermediate flange connections and the installation and life-cycle inspection and maintenance costs typically associated with steel towers. Additionally, the need for separate paint operations, re-painting, or touch-up during the turbine operating life, as well as the associated costs, typically required with steel towers is eliminated.

Exemplary embodiments of wind turbine towers and methods of fabricating the wind turbine towers are described above in detail. These wind turbine towers and methods for fabricating these wind turbine towers are not limited to the specific embodiments described herein, but rather, components of the wind turbine towers may be utilized independently and separately from other components described herein. For instance, the wind turbine towers and methods of fabricating the wind turbine towers described above may have other industrial or consumer application, and are not limited to use only in those applications as described herein. Rather, the present disclosure may be implemented and utilized in connection with many other products and in other environments.

While the invention has been described in terms of various specific embodiments, those skilled in the art will recognize that the invention can be practiced with modification within the spirit and scope of the claims.

What is claimed is:

1. A method for fabricating a tower or component thereof for use with a wind turbine, said method comprising:
    weaving a fibrous tow around a first mandrel in a shape corresponding to the shape of the tower or component to form a flexible textile preform;
    removing the flexible textile preform from the first mandrel prior to transporting;
    positioning the flexible textile preform onto a second mandrel prior to laminating; and
    laminating the flexible textile preform to form a composite shell or a section thereof.

2. The method in accordance with claim 1, further comprising transporting the flexible textile preform to a tower assembly site prior to laminating.

3. The method in accordance with claim 1, further comprising infusing the flexible textile preform with resin prior to laminating.

4. The method in accordance with claim 1, further comprising weaving the fibrous tow around the first mandrel to form a first layer of textile composite and weaving the fibrous tow around the first layer of textile composite to form a second layer of textile composite.

5. The method in accordance with claim 1, further comprising weaving the fibrous tow around the first mandrel to form a first layer of textile composite, positioning a layer of core material adjacent to the first layer of textile composite, and weaving the fibrous tow around the layer of core material to form a second layer of textile composite.

6. The method in accordance with claim 5, wherein the core material comprises a material selected from the group consisting of balsa wood, polyvinyl chloride foam, styrene acryl nitrate foam, polyethylene foam, and combinations thereof.

7. The method in accordance with claim 1, wherein the flexible textile preform is laminated using a process selected from the group consisting of resin transfer molding and vacuum assisted resin transfer molding.

8. The method in accordance with claim 1, wherein the fibrous tow comprises fiberglass, carbon fibers, aramid fibers, or combinations thereof.

9. The method in accordance with claim 1, wherein the fibrous tow comprises a size of from about 12,000 to about 80,000.

10. The method in accordance with claim 1, wherein the flexible textile preform is a single layer.

11. The method in accordance with claim 10, wherein the flexible textile preform comprises a thickness of from about 3 mm to about 10 mm.

12. The method in accordance with claim 10, wherein the single layer is a three-dimensional layer.

13. The method in accordance with claim 1, wherein the weaving comprises braiding the fibrous tow.

* * * * *